Jan. 24, 1933.   J. F. PANYARD   1,895,340
TIRE BOOT
Filed Sept. 19, 1929
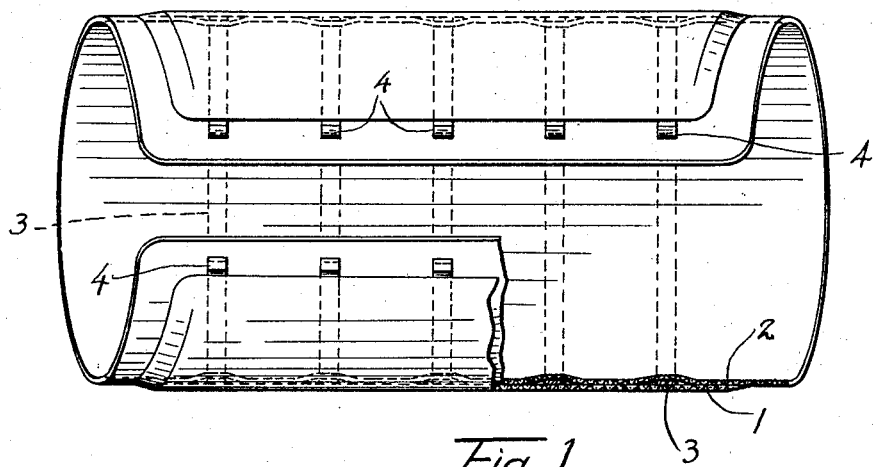
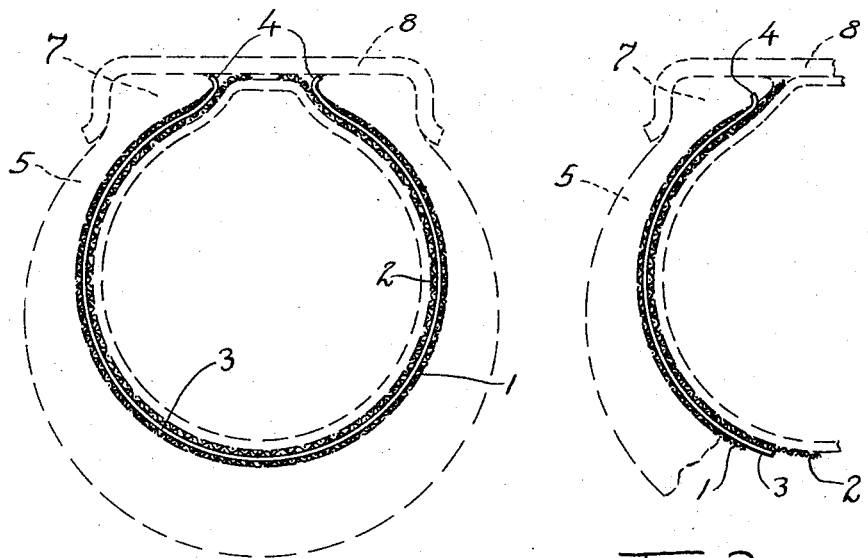
INVENTOR.
John F. Panyard
BY Parker & Burton
ATTORNEYS Patented Jan. 24, 1933

1,895,340

UNITED STATES PATENT OFFICE

JOHN F. PANYARD, OF DETROIT, MICHIGAN, ASSIGNOR TO MINNIE B. PANYARD, OF DETROIT, MICHIGAN

TIRE BOOT

Application filed September 19, 1929. Serial No. 393,679.

My invention relates to reinforcing elements which are commonly used to strengthen worn or weakened portions of automobile tire casings and has particular reference to what are commercially known as "boots" for the tire casing.

When the casing of an automobile tire becomes lacerated or cut in such a way as to easily permit exposure of the inner tube to nails, tacks, sharp stones and the like it is customary to place one of these tire boots inside the casing over the worn spot therein to protect the inner tube.

Various types of boots are known to the art. The boot may be placed loosely in the tire between the casing and inner tube; it may have a lacing which is secured together over the tube; it may have wings in the form of extending fabric margins which are folded over the edge of the casing; or it may be studded throughout its entire casing contacting surface with sharp pointed tacks which are driven into the casing by the pressure of the tube.

All these types possess disadvantages. They fail to hold their place, or bulge through the hole in the casing or in case of the studded one tear the casing.

My improved tire boot is adapted to retain positively its position in the casing without wear or tearing of the casing and without protrusion through the hole in the casing.

In accomplishing the above purpose an object of my invention resides in the provision of a tire boot which may be placed in the tire casing over a weak or cut portion thereof and firmly anchored in this position at a point along the reinforced edges of the side walls of the tire casing.

A further object of my invention is to devise means for anchoring the tire boot so that the contacting of the booted portion of the tire with the road will have no tendency to wear away the tire casing.

Another object of my invention is to provide a tire boot having anchoring means which become more firmly anchored in the proper position and to the reinforced portion of the casing as more pressure is exerted thereon by the inner tube.

A further object of my invention is to provide a tire boot which is more efficient and less expensive to manufacture than the boots now in use.

Further meritorious features and objects of my invention will become apparent with the following description accompanied by the drawing wherein like numerals refer to like parts throughout the several figures and wherein:

Fig. 1 is a plan view of one specific form of my novel boot.

Fig. 2 is a cross section of a tire casing having a boot provided with my novel anchoring means inserted therein.

Fig. 3 is a view taken on the same line as Fig. 2 showing a modified form.

For the outer surface 1 of my tire boot I utilize any sort of tough reinforcing material such as the fabric which is used in the making of ordinary tire casings. On one side of the layer 1, I place another layer 2, which may likewise consist of fabric reinforcing material, or may be rubber obtained from cast-off inner tubes. This second layer of my tire boot protrudes beyond the outer edge of the layer 1 and a plurality of reinforcing strips are laid transversely of the reinforcing elements between the layers thereof, extending beyond the lateral edges of the outer layer 2 on each side thereof. These two layers are firmly secured together to retain the transverse members 3 in their spaced apart position.

Any desirable means of securing the layers with the transverse members therebetween may be utilized. A very economical and satisfactory means of so doing, however, is to vulcanize the two layers together after having placed the transverse members in their proper position therebetween. Each of these transverse members is provided at its outer extremity with a slight outward bend 4 in the direction of the outer reinforcing layer which is designed to provide an anchoring means for retaining the assembly in position within the casing.

When the boot is placed in the tire casing 5, the bent-over portions 4 of the transverse members 3 anchor themselves in the side wall of the tire casing, over what is customarily called the "toe" portion thereof above the beading 7 of the side walls. The rim 8 of the tire tends to press the bent-over portions 4 against the toe of the casing and a firm anchorage is thereby obtained. It is obvious that as the inner tube is inflated a greater pressure will be exerted around the inner circumference of the tire boot tending to press the same more firmly against the casing and produce a still firmer anchorage.

It is obvious that innumerable modifications and changes of my structure may be devised to accomplish the same object. As illustrative of the principle involved I have shown the transverse members 3 as being narrow strips of spring steel and secured between two layers of reinforcing material. Certain objects of my invention might be attained by attaching these anchoring members only to the outer extremities of the tire boot by satisfactory means. It might not be necessary to utilize two layers of reinforcing material. I have simply shown a preferred embodiment designed to provide a very advantageous means of anchoring the boot within the tire casing.

Preferably the outwardly turned ends of the steel strips are disposed to engage in the reenforced edge portions or beads of the casing where any tendency to tear the casing is reduced to a minimum and the boot is held securely in place by the embedding of the ends of the strips in these reinforced bead portions.

These steel strips may be extended to anchor in the bead portions of the casing as in Fig. 3. The strips serve at all times to maintain the contour of the boot and prevent its protruding through the hole in the casing.

As above stated various modifications of my invention will be apparent to those skilled in the art and I, therefore, intend to limit myself only within the scope of the appended claims.

I claim:

1. A tire boot comprising a flexible piece of reenforcing material, and resilient means extending transversely through said material and beyond the edges thereof adapted to anchor in the side walls of the tire casing beyond the edge of said reenforcing material.

2. A tire boot comprising a plurality of layers of flexible reinforcing material and a plurality of resilient metallic strips extending transversely through said layers at longitudinally spaced apart intervals, the extremities of each of said strips projecting beyond the edge of the reinforcing material and being reversely curved to engage the bead of a tire casing.

In testimony whereof, I, JOHN F. PANYARD, sign this specification.

JOHN F. PANYARD.